United States Patent [19]

Barri

[11] Patent Number: 5,199,027
[45] Date of Patent: Mar. 30, 1993

[54] COMMUNICATION SWITCHING SYSTEM

[75] Inventor: Peter I. A. Barri, Bonheiden, Belgium

[73] Assignee: Alcatel N.V., Amsterdam, Netherlands

[21] Appl. No.: 613,520

[22] PCT Filed: Mar. 14, 1989

[86] PCT No.: PCT/EP89/00281
§ 371 Date: Nov. 5, 1990
§ 102(e) Date: Nov. 5, 1990

[87] PCT Pub. No.: WO90/10984
PCT Pub. Date: Sep. 20, 1990

[51] Int. Cl.$^5$ .................................. H04L 12/56
[52] U.S. Cl. .................................. 370/60; 370/60.1
[58] Field of Search .................. 370/60, 60.1, 94.1, 370/94.2

[56] References Cited

U.S. PATENT DOCUMENTS

4,896,316  1/1990  Lespagnol et al. ............... 370/60
4,914,650  3/1990  Sriram ................................ 370/60

Primary Examiner—Douglas W. Olms
Assistant Examiner—Wellington Chin
Attorney, Agent, or Firm—Ware, Fressola, Van Der Sluys & Adolphson

[57] ABSTRACT

Communication switching system wherein for each cell stream to be transmitted through a switching element a virtual path is established from an input link to an output link of this element on the basis of the individual bandwidth used by this cell stream and of the then calculated total bandwidth used on this output link. For each cell stream a maintenance cell containing the individual cell stream bandwidth is transmitted on the corresponding virtual path and by means of these maintenance cells the total bandwidth used on each output link is re-calculated and it is checked if it is equal to the above mentioned calculated total bandwidth. The latter is adjusted if a difference is detected.

17 Claims, 4 Drawing Sheets

PATH SET-UP CONTROL CELL

MAINTAINANCE CELL

FIG. 5

COMMUNICATION SWITCHING SYSTEM

BACKGROUND OF THE INVENTION

1. Field of the Invention

The present invention relates to a communication switching system including a switching network with at least one switching element having a plurality of input links and at least one output link, and processing means for calculating the total bandwidth used by virtual paths on said output link from individual bandwidth values contained in path setup cells used for setting up said virtual paths.

2. Description of the Prior Art

Such a communication switching system is already described in the PCT application No. PCT/EP88/00482. In this known switching system the total bandwidth used by the virtual paths on an output link is obtained by calculating the sum of the individual bandwidth values contained in the path setup cells for these paths. A new virtual path is allowed to be multiplexed on the output link only when the thus calculated total bandwidth is smaller than the maximum allowable bandwidth.

The thus calculated total bandwidth may be erroneous due to a fault, for instance because an individual bandwidth value is erroneous, or due to a calculation error, etc. Such a fault may give rise to a traffic overload on the output link or to an undue restriction of the traffic load on this link since the decision to allow or inhibit the multiplexing of a new virtual path on an output link is based on the thus calculated total bandwidth.

SUMMARY OF THE INVENTION

An object of the present invention is to provide a communication switching system of the above type, but wherein the effect of previous, especially temporary errors, on the calculated total bandwidth is reduced.

According to the invention this object is achieved due to the fact that said processing means re-calculate said total bandwidth at least from said individual bandwidth values contained in maintenance cells transmitted on said virtual paths and adjust said calculated total bandwidth in function of said re-calculated total bandwidth.

By thus recalculating the total bandwidth the effect of temporary errors which possibly occurred during a previous calculation is reduced if not eliminated.

Another characteristic feature of the present communication switching system is that the transmission of said maintenance cells is interleaved with that of said path setup cells and that said processing means store said calculated total bandwidth in a first memory and at the start of a recalculation operation copy said calculated total bandwidth from said first memory into a second memory and reset the contents of a third memory, the total bandwidth stored in said second memory and said individual bandwidth values being then used to re-calculate said total bandwidth in a cumulative way and the successive partial results thus obtained being stored in said third memory.

Still another characteristic feature of the present communication switching system is that the transmission of said maintenance cells is also interleaved with the transmission of path release cells containing an individual bandwidth value relating to the virtual path to be released and that said processing means in addition to performing a path release operation process each of said path release cells in the same way as each of said maintenance cells.

Hence, although the normal operation of the system is continued, i.e. although virtual paths may be built up or released and thus give rise to a change of the contents of the first memory, such a change has no effect on the re-calculation operation since the latter makes use of the contents of the second and third memories only. In other words the bandwidth re-calculation is isolated from the normal bandwidth calculation.

DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE PREFERRED EMBODIMENT

Figure 1:
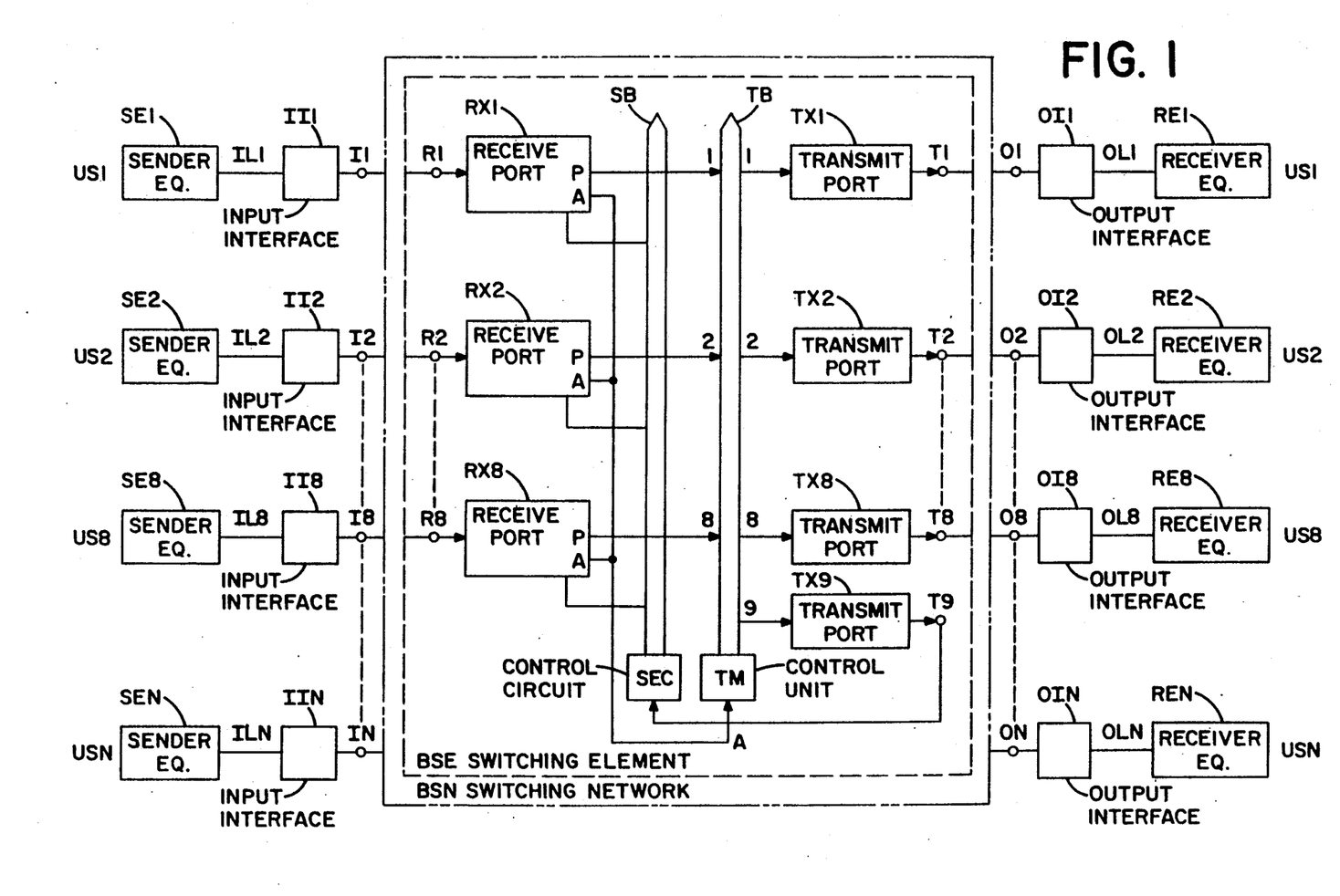
FIG. 1 represents a communication switching system according to the invention and details of a switching element BSE used in a switching network BSN of this system.

The communication switching system shown in FIG. 1 is of the type described in the PCT application No. PCT/EP88/00482 and includes a multi-stage broadband packet or cell switching network BSN having a plurality of input terminals I1/N and a plurality of output terminals O1/N, as well as a plurality of user stations US1/N or outside nodes each comprising a sender equipment SE1/N and a receiver equipment RE1/N. The sender equipments SE1/N are coupled to the input terminals I1/N of BSN via respective asynchronous time division (ATD) or asynchronous transfer node (ATM) input transmission links IL1/N and respective input interface circuits II1/N. The output terminals O1/N of BSN are coupled to the receiver equipments RE1/N through respective output interface circuits OI/N and respective ATD or ATM output transmission links OL1/N.

Each of the user stations includes a traffic measurement equipment of the type described in the PCT application No. EP88/01037.

In the cell switching network BSN the N input terminals I1/N are coupled to the N output terminals O1/N via a number of cascaded stages of switching elements or inside nodes of which only one, BSE, is shown in relative detail. This switching element has 8 input terminals R1/8 connected to respective output terminals of a preceding stage via multiplex input links (not shown) and 8 output terminals T1/8 connected through multiplex output links (not shown) to respective input terminals of a following stage (not shown). This means that the switching element BSE may be considered as having 8 bidirectional terminals R1/T1 to R8/T8 each connected to a bidirectional multiplex link on which a plurality of communication paths may be multiplexed.

Inside the switching element BSE the input terminals R1/8 are connected to respective input or receive ports RX1/8 which have a cell output P and an address output A and which are further connected through an interconnection bus SB to a switching element common control circuit SEC. The cell outputs P are connected to inputs 1/8 of a Time Division Multiplex (TDM). interconnection bus TB which is controlled by a control unit TM to which the address outputs A of the receive ports RX1/8 are connected. Eight outputs 1/8 of the bus TB are connected through respective output or transmit ports TX1/8 to respective output terminals T1/8 and a ninth output 9 is connected to the control circuit SEC via a transmit port TX9 having terminal T9.

Figure 2:
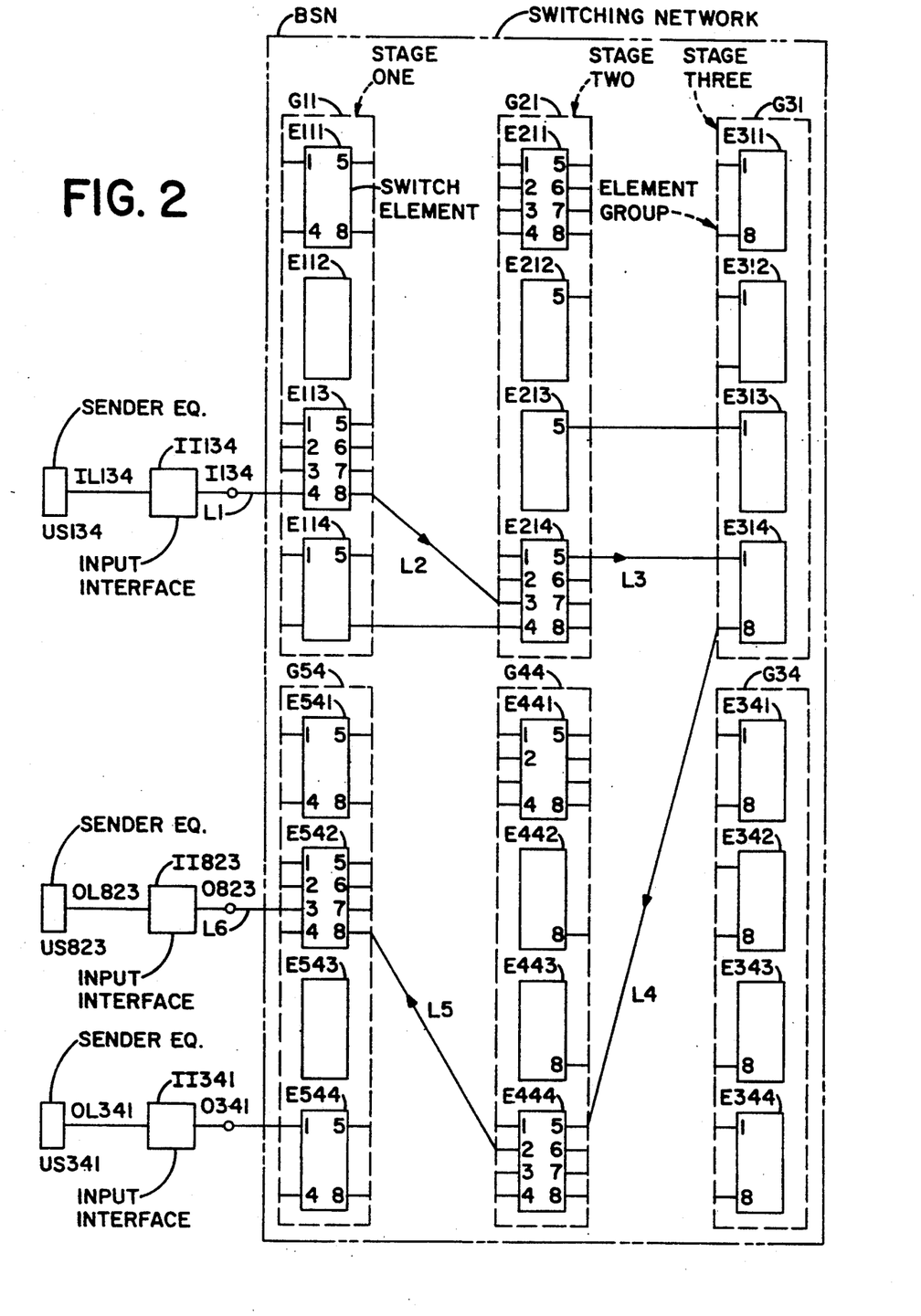
FIG. 2 shows an example of this switching network BSN.

An example of the switching network BSN is represented in FIG. 2 and is also of the type disclosed in the first above mentioned PCT application. It is a folded one, with both the input and output terminals on one (left) side and a mirror plane at the other (right) side. Between a terminal used as input and the mirror plane, BSN is a distribution network where the path selection may be performed freely, whereas between the mirror plane and a terminal used as output it is a routing network wherein the path is predefined. A path selected in the distribution network may be extended in the routing network to any of the outputs. The switching network BSN includes three stages of switching elements whose terminals 1/8 each represent both a receive terminal R1/8 and a transmit terminal T1/8. These three stages of switching elements can be used to interconnect a terminal used as input with a terminal used as output through as many as five stages. While the third stage on the mirror side comprises four groups G31 to G34 with only G31 and G34 being shown each with four elements E311/314 and E341/344, the first and second stages each include eight groups each also with four elements. Merely to illustrate a possible connection through five stages, the groups of the first stage have been labelled G11 to G14 and G51 to G54 and likewise for G21 to G24 and G41 to G44 constituting the second stage. Thus, with only groups G11, G21, G31, G34, G44 and G54 shown in FIG. 1, a possible 5-stage connection involving links L2, L3, L4 and L5 passes through G11 and G54 both of the first switching stage but G11 being used as the first stage of this particular connection and G54 as the fifth. Likewise for G21 and G44 both of the second switching stage but with G21 as the second stage of this particular connexion and G44 as the fourth. But such 5-stage connections in a folded network may also involve only G11 to G14 or only G51 to G54 in the first stage and likewise for G21 to G24 or G41 to G44 in the second. The interconnection between the groups and the elements is such that the first group of the first stage can only access the first groups of the second stage and likewise for the remaining 7 groups in these two stages. For each such pair of groups, each of its 4 elements has access to the 4 elements of the paired group. Since there are only 4 groups in the stage, the 8 terminals of each of its 4×4 switching elements can be associated with 4 terminals of each of the 8 groups of 4 switching elements of the second stage also on a one to one basis, each element of the second stage having access to all groups of the third stage and vice-versa.

Figure 3:
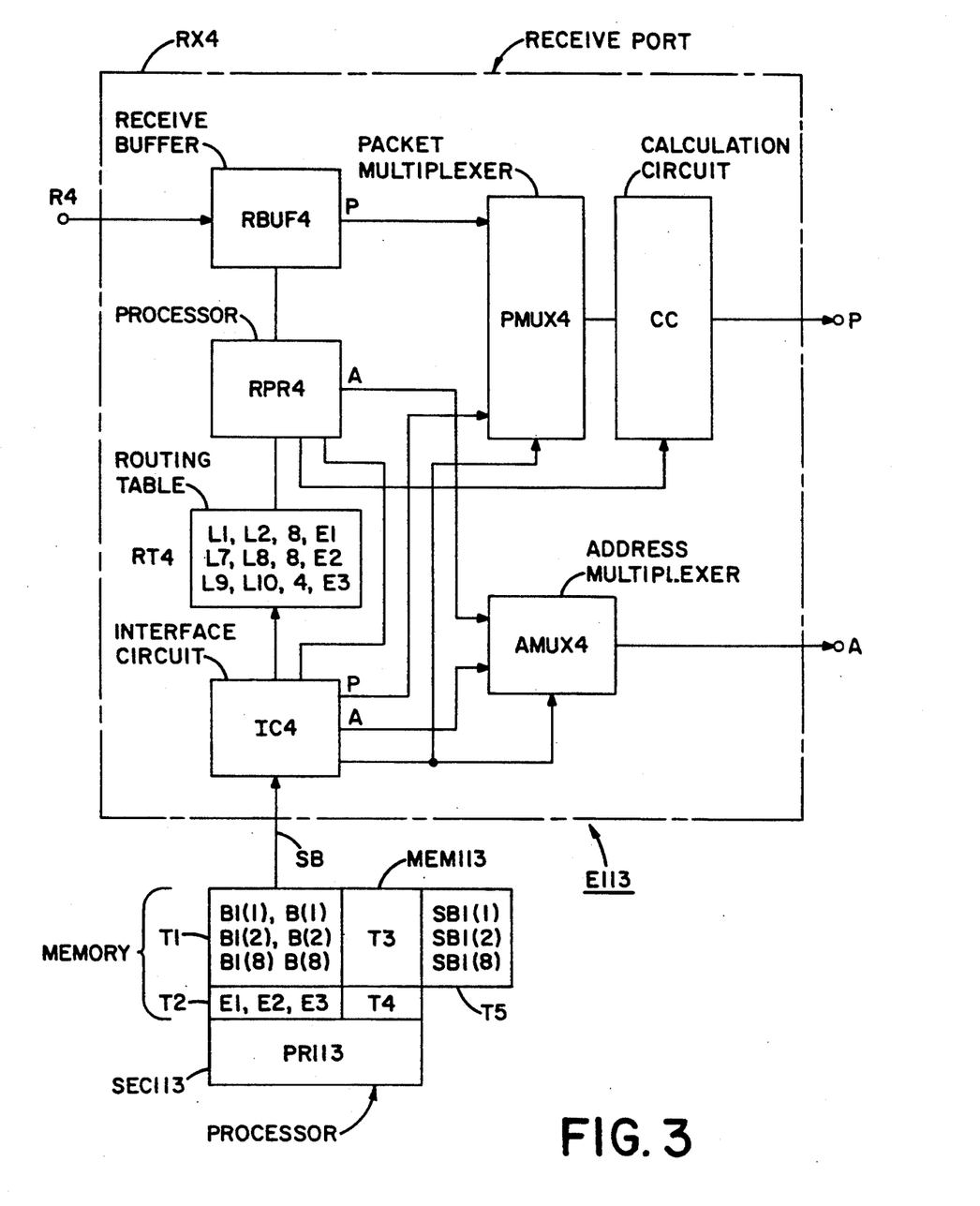
FIG. 3 represents the receive port RX4 and the control circuit SEC113 of a switching element E113 of FIG. 2 in more detail.

FIG. 3 shows for such a switching element as E113 in FIG. 2, the essential parts of its receive port RX4 and of its control circuit SEC113.

The receive port RX4 includes a receive buffer RBUF4, a processor RPR4, a routing table RT4, an interface circuit IC4, a packet multiplexer PMUX4, an address multiplexer AMUX4 and a calculation circuit CC. The above mentioned bus SB is connected to the interface circuit IC4 which has access to the processor RPR4 and to routing table RT4 and the latter table is coupled to the processor RPR4 which has access to the buffer RBUF4 and to the calculation circuit CC. The buffer RBUF4 has a cell input R4 and a cell output P which is connected to an input of the cell multiplexer PMUX4 whose output is connected to the calculation circuit CC. A cell output P of the interface circuit IC4 is connected to another input of PMUX4. The processor RPR4 and the interface IC4 further have address outputs A which are connected to respective inputs of the address multiplexer AMUX4. The multiplexers PMUX4 and AMUX4 are controlled by the interface circuit IC4. The outputs P of the calculation circuit CC and A of the multiplexer AMUX4 constitute the outputs of the receive port RX4.

The switch element control circuit SEC113 includes a processor PR113 and an associated memory MEM113 which includes, amongst others, tables T1 to T5. The contents of T1 to T5 and of the above routing table RT4 will be described later.

In the present system cell streams are transmitted comprising data cells, control cells, e.g. of the type described in the first above mentioned PCT application, and maintenance cells. In the following only the function of a path setup control cell, a path release control cell and a maintenance cell is considered in detail.

Figure 4:
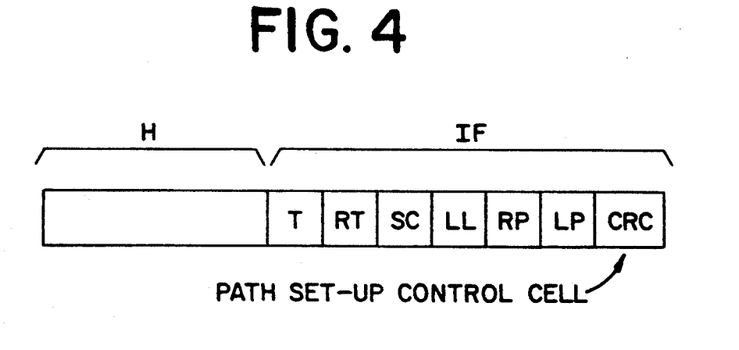
FIGS. 4 and 5 show the structure of a path setup control cell and of a maintenance cell respectively used in the system of FIG. 1.

The structure of a path setup control cell is schematically represented in FIG. 4. It includes a header H and an information field IF. The header H identifies the cell and includes a header error checking code. In the information field IF:

T: is the type of cell, e.g. a point-to-point path set up control packet;

RT: is a routing tag containing for instance five sets of 4 bits. Each set defines a respective one of the 16 terminals or links of a switching element and the sets are associated to respective switching elements of the five stages via which a connection may be stablished;

SC: is a selection code indicating for each of the terminals of RT is the selection thereof has to be performed freely (FS) or is fixed (F);

LL: are labels identifying the communication paths on the links of a connection;

RP: is the identity of a return path in the network;

LP: are traffic load parameters characterizing the individual bandwidth used by a cell stream, e.g. the average and variance, as described in the European patent application 88202852.5;

CRC: is a check code which is function of the contents of the information field IF and used to check the latter.

The structure of a path release control cell is not given in detail but may be found in the second above mentioned PCT application.

A data cell includes a header constituted by a label identifying the virtual communication path used on the link of which the cell is transmitted and an information field which comprises data.

Figure 5:
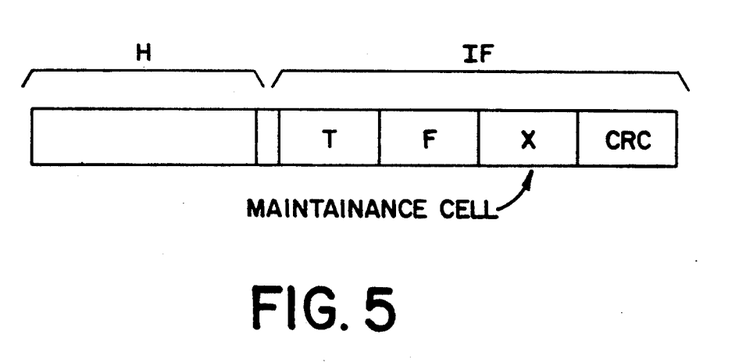

The structure of a maintenance cell associated to a virtual path or cell stream defined by its traffic parameters is schematically represented in FIG. 5. It includes a header H and an information field IF. The header H is of the same type as of a data cell but includes a single last bit indicating that a maintenance cell is concerned. In the information field IF:

T: is the type of maintenance cell;

F: is a field to be modified in the switching element wherein the cell is processed;

X: is a field containing, amongst others, the identity of the source of the cell stream and the above mentioned traffic load parameters LP;

CRC: is a check code which is function of the contents of the information field IF and used to check the latter.

Reference is now made to FIGS. 2 to 5 for the description of the establishment of a virtual communication path between an originating user station US134 and a destination user station US823.

To establish such a path the user station US134 launches a path setup control cell (FIG. 4) which, amongst others which are not considered here, contains the following fields:

RT: X, X, 8, 2, 3
SC: FS, FS, F, F, F
LL: L1, X, X, X, X, X
RP: X, X, X, X, X with X = undetermined;
FS = free selection;
F = fixed selection.

This means that for the path to be established the selection of the output link to be used is free in the first and second stages of the network, that the output links 8, 2 and 3 whose identities are stored in the cell have to be used in the following three stages of this connection, and that the label L1 to be used for the virtual communication path on the link interconnecting US134 and the first stage of the network.

When this cell is received on the input terminal R4 or input link 4 (FIG. 2) of the receive port RX4 of the switching element E113 (FIG. 3), it is entered in the receive buffer RBUF4 thereof under the control of the processor RPR4. This processor reads the header H of the packet and a checking circuit (not shown) forming part of the buffer RBUF calculates the check code for the information field IF and verifies if it is equal to the check code CRC of the cell or not. The result of this check is communicated to the processor RPR4 and when the latter detects that the header is a data cell this result is ignored since it then has no meaning, whereas otherwise it is used to continue or stop the processing of the cell.

To be noted that if the cell were a maintenance cell the processor RPR4 would enable the operation of the calculation circuit CC. However, because the cell is a control cell and supposing that the code check is successful the processor RPR4 does not enable the operation of the calculation circuit CC. Instead it performs the following operations:

it writes the address 4 of the input terminal or input link 4 (or R4) on which the cell is received and of which the corresponding output link has to be used by a return or backward cell, in the first position of the return path field RP of the cell, so that this field becomes:

RP: 4, X, X, X, X and then supplies this cell from RBUF4 to the cell multiplexer PMUX4;

via its address output A it applies the address 9 of the output terminal or output link T9 of the transmit port TX9 to the address multiplexer AMUX4;

The processor RPR4 then controls the interface circuit IC4 in such a way that the latter operates the multiplexers PMUX4 and AMUX4. As a consequence, from these multiplexers the path setup cell is supplied via the output P to the input 4 (not shown) of the bus TB and the address is communicated via the output A to the control unit TM of this bus TB. As a result the control unit TM connects the input 4 of TB to the transmit port TX9 and transmits the cell thereto. The latter port then routes the cell to the switching element control circuit SEC113 via its output T9.

Upon the receipt of the path setup control cell in the control circuit SEC113 the processor PR113 thereof performs the functions described hereinafter.

This processor PR113 selects an output terminal or output link of the switching element E113, e.g. T8 or 8, on which the path setup cell, and later the data cells of the cell stream following it, have to be transmitted to the second stage or node of the switching network.

In the way described in the above European patent application the processor PR113 calculates the new bandwith on this link by means of the previously calculated bandwidth value B1(8) or load counter value stored in table T1 of the MEM113 and the traffic load parameters LP contained in the cell. It then checks if the newly calculated bandwidth or new load counter value is smaller or larger than the maximum allowable bandwith B(8) also stored in table T1 of the MEM113 and accordingly allows the control cell to be multiplexed on the selected output link 8 or refuses to do so. In the latter case the processor selects another output link and performs similar calculations, etc. In this way either a suitable output link, i.e. a suitable virtual communication path thereon, is found or not and in the latter case the switching element E113 is considered to constitute a blocked end for the communication under consideration. In the following it is supposed that E113 is not a blocked end and that output link 8 may be used.

Under this assumption the processor PR113 selects in MEM113 a new label L2 to indicate the selected virtual communication path on this output link 8. The processor PR113 also writes in the routing table RT4 of the receive port RX4 the routing information or relationship L1, L2, 8, E1 linking the input communication path with label L1 on input link 1 with the output communication path with label L2 on output link 8 and with a busy/idle bit E1 on 1 indicating that the virtual path is busy (otherwise this bit is on 0). This happens via the bus SB and the interface circuit IC4 of this port. The processor PR113 also stores the bit E1 in the table T2 of its memory MEM113 at a location having the coordinates R4, L1.

Finally, the processor PR113 also modifies the contents of the path setup cell by writing 8 and L2 in the first positions of the fields RP and L respectively, by changing FS in the first position of SC by F and by then subjecting RT and SC to a circular shift in anti-clockwise direction. Thus the fields of the cell become:

RT: X, 8, 2, 3, 8
SC: FS, F, F, F, F
LL: L2, L1, X, X, X, X
RP: 4, X, X, X, X.

The thus modified cell and the address 8 are then transmitted via the bus SB to one of the receive ports RX1/8 e.g. to RX4 and more particularly to the interface circuit IC4 which supplies the cell to the cell multiplexer PMUX4 and applies the address 8 to the address multiplexer AMUX4 via its outputs P and A respectively. Under the control of IC4 the cell is then transmitted from these multiplexers and via the bus TB to the transmit port TX8. By this transmit port TX8 it is afterwards transmitted on the output link 8 of E113 to the input terminal 3 of the switching element E214 where operations similar to those described above are executed, etc. Thereby the fields RT, SC, LL and RP of the cell are modified as follows in the switching elements or inside nodes E214, E314, E444 and E542 if these nodes are not found to be dead ends and before being transmitted therefrom to a following node:

RT: 82385; 23858; 38582; 85823
SC: FFFFF; FFFFF; FFFFF; FFFFF
LL:     L3L2L1LXXX;     L4L3L2L1XX; L5L4L3L2L1X; L6L5L4L3L2L1
RP: 34XXX; 134XX; 5134X; 85134.

In this way the point-to-point virtual path shown in FIG. 2 has been established. To be noted that this connection is similar to that described in the first above mentioned PCT application. This connection is as follows: user station US134, link IL134 on which the communication label L1 is used, I1134, R4 and T8 and E113, output link 8 on which the label L2 is used, R3 and T5 of E214, output link 5 on which label L3 is used, R1 and T8 of E314, output link 8 on which label L4 is used, R5 and T2 of E44, output link 2 on which label L55 used, R8 and T3 of E542, OI823 and output link OL823 on which label L6 is used.

From the above it follows that subsequent to the successful transmission of a virtual path setup control cell using the input link R4 and the output link 8 element E113 the tables RT4, T1 and T2 store the following information relating to this virtual path:

RT4 stores L1, L2, 8, E1 with E1=1;
T1 stores the newly calculated bandwidth or load counter value B1(8)for output link 8;
T2 stores the busy/idle path bit E1=1 in a location determined by the coordinates R4 and L1.

In a similar way as described above other virtual paths are built up through the switching network, as a consequence of which the routing tables of the receive ports as well as the tables T1 and T2 in the memory circuits of the common control circuits of the switching elements are updated. As an example, the routing table RT4 and the tables T1 and T2 of the memory MEM113 of the SEC113 for instance store the following information:

RT4: L1, L2, 8, E1 with E1=1; L7, L8, 8, E2 with E2=1 for virtual paths using the output link 8 of E113; L9, L10, 4, E3 with E3=1 for a virtual path using the output link 4 of E113.
T1: B1(1) to B1(8) together with B(1) to B(8) the allowable bandwidths;
T2: E1=1, E2=1 and E3=1 in the locations having coordinates R4, L1; R4, L7 and R4, L9 and E=0 in the other locations.

After the establishment of the above virtual paths, data cell streams are transmitted thereon by the user stations. In each of these stations the traffic measurement equipment included therein checks for each cell stream if the corresponding traffic load parameters on the basis of which the multiplexing of this cell stream on an output link was allowed are respected. This traffic measurement equipment also adapts the cell streams if required, e.g. by dropping cells. By proceeding in this way it is ensured that the traffic load parameters reflect the exact traffic load and vice versa.

With the purpose of checking the correctness of the various load counters stored in the tables T1 of the memories of the various control circuits each of the user stations from which virtual paths have been established transmits on each of these paths a series of maintenance cells at a predetermined frequency. These maintenance cells are interleaved with the path setup cells. The frequency and the length of a measurement time interval are so chosen that in each control circuit associated to a switching element and with a very high probability, i.e. with a negligible loss, at least one maintenance cell is received on each of the virtual paths using this switching element.

As an example, when the maximum rate of the maintenance cells is for instance equal to 100 per link and per second and when the number of virtual paths per link is equal to 8000, then the time to transmit one maintenance cell on each of these paths is equal to T=80 seconds. One may then calculate that for instance for a switching element having 16 input/output links the measurement interval should be taken equal to 4T in order that the probability of loss of a maintenance cell in these links during this interval should be negligible. To be noted that the measurement intervals follow one another in a continuous way and are each initiated by the processor PR113.

Each such maintenance cell transmitted on a virtual path contains the traffic load parameters LP defining the individual bandwidth of the cell streams on this path. Because these parameters are monitored by the traffic measurement equipment they are indicative of the real bandwidth used on this path. For instance, the user station US134 (FIG. 2) generates a series of maintenance cells for each of the virtual paths on the input link R4 of the receive port RX4 of the switching element E113, these virtual paths being defined in the routing table RT4.

At the start of each measurement interval the processor PR113 forming part of E113 copies the load counters B1(1) to B1(8) of the switch element E113 and the E-bits of all the virtual paths on the input links of this element from the tables T1 and T2 into the tables T3 and T4 respectively. It also resets all the so called auxiliary or shadow load counters SB1(1) to SB1(8) stored in a table T5. These measures are taken in order that the bandwidth re-calculation operation should be independent from changes of the virtual paths and therefore also of the bandwidth used on the links.

In connection with the above it should also be noted that as long it is stored in the routing table RT4 or T2, a path bit E indicates that the corresponding virtual path is busy (1) or idle (0), whereas when it is stored in the table T4 it indicates that a maintenance cell received on the corresponding virtual path has to be processed (1) or not (0) by the processor PR115.

As an example, the function of the first of a series of maintenance cells relating to the virtual path L1, L2, 8, E1 defined in the routing table RT4 and received during a measurement interval is considered.

When this first maintenance cell is received in the receive buffer RBUF4 its check code CRC is verified in the same way as described above for a path setup control cell. However, if this check is successful the processor RPR4 upon detecting from the last bit of the header of this cell that a maintenance cell is concerned consults the routing table RT4 by means of the label L1 contained in the header and uses this information

L1, L2, 8, E1 as follows:
it substitutes L2 for L1 in the cell header;
it inserts the identity R4 of the input link in this information and writes the following data

L1, R4, 8, E1 in the field F of the cell, L1, R4 and L2, 8 define the virtual paths on the input and output links respectively;
it then applies the thus obtained cell to the input P of the cell multiplexer PMUX4;
it operates the calculating circuit CC in order that it should calculate a new check code for the information field IF and substitutes this code for the old one. Such a calculation is required because the F-field of the cell has been changed;
it applies the addresses of the output links 8 and 9 of the transmit ports TX8 and T9 to the input A of the address multiplexer AMUX4.

The processor RPR4 then controls the interface circuit IC4 in such a way that the latter operates the multiplexers PMUX4 and AMUX4. As a consequence the maintenance cell is supplied via the output P to the input 4 of the bus TB and the addresses 8 and 9 are communicated via the output A to the control unit TM of this bus. As a result the control unit TM connects the input 4 of TB to the transmit ports TX8 and TX9. The transmit port TX8 then transmits the cell to the following switching element E214 via its output T8, whilst the transmit port TX9 supplies the cell to the switching element control circuit SEC113 via its output T9.

In the switching element E214 the maintenance cell is processed in a similar way as in the switching element E113 and this processing will therefore not be described further. But it is clear that by proceeding in this way the maintenance cell will finally be transmitted to the destination station if the path is not interrupted. In other words the maintenance cell may be used for an end-to-end verification of the path continuity.

The maintenance cell supplied to SEC113 is stored in the memory MEM113 thereof and is then locally processed by the processor PR113. More particularly, the latter uses the information R4, L1 stored in the F-field of the cell to address the table T4 and to find therein the corresponding E-bit, i.e. E1=1. Because this bit is on 1, as the maintenance cell is supposed to be the first maintenance cell transmitted on the virtual path L1, L2 using the links R4 and 8, the processor PR113 processes this cell. More particularly, it re-calculates the total bandwidth used on the output link 8 from the individual bandwidth defined by the traffic parameters LP contained in the X-field of the cell and from the previously calculated bandwidth stored in the auxiliary load counter SB1(8) associated to this output link 8 and found in the table T5 by means of the identity 8 of the output link stored in the F-field of the cell. PR113 stores the cumulative sum obtained in this auxiliary load counter SB1(8) associated to the output link. Afterwards the processor PR113 resets the bit E1 to 0, thus indicating that on the virtual path L1, L2, R4, 8 a first maintenance cell has been received and processed and that further maintenance cells on this path are not to be processed.

In a similar way the load counter SB1(8) is again updated upon receipt, during the measurement interval of the first maintenance cell on the virtual path L7, L8, 8, E2 including the output link 8, and the load counter SB1(4) is updated upon receipt, during this interval, of the first maintenance cell on the virtual path L9, L10, 4, E3 including the output link 4. Also the bits E2 and E3 are then reset in the table T4 thus indicating that a first maintenance cell has been received on these virtual paths and that further maintenance cells received on these paths should not be processed.

In the course of a measurement interval it may happen that a virtual path is added or released and in both cases the contents of the tables T1 and T2 are updated. In the first case no updating of the tables T3/4/5 is required since the updating will take place during a following measurement interval. On the contrary, in the second case precautions have to be taken because the individual bandwidth of the released path on the one hand is already included in the total bandwidth information stored in the third table T3 and on the other hand it has not yet been taken into account for updating the corresponding auxiliary load counter when the corresponding E-bit is still on 1. Also because of the path release no maintenance cells will be received.

For this reason the path release cell in addition to its path releasing function performs the same function as a maintenance cell in the tables T3/4/5. This is described hereafter.

Such a path release cell is generated in the manner described in the first above mentioned PCT application when a dead end of a virtual path is detected in a node and is interleaved with the maintenance and path setup cells. The path release cell contains the individual bandwidth information defined by the traffic parameters LP. Upon its receipt in e.g. the above receive port RX4 the processor RPR4 thereof inserts the identity R4 of the input link in the cell and routes it to the control circuit SEC113 in a way similar to that described above for a maintenance cell. If the corresponding E-bit is in the set condition the processor PR113 then increases the contents of the auxiliary load counter SB1(8) in table T5 by the individual bandwidth of the cell and resets the corresponding E-bit in table T4. In the usual way it also clears the connection by updating the tables T1, T2 and RT4.

As mentioned above the measurement interval is so chosen that during this interval—and with a very high probability—at least one maintenance cell is received for each of the virtual paths on all the input links of E113. As a consequence at the end of the measurement interval all the E-bits of this table should normally be on 0 and the auxiliary load counters in the table T5 should all be in a position equal to that of the real load counters B1(1) to B1(8) stored in the table T3 Differences only occur in case of error, e.g. when the values B1(1) to B1(8) are not correct and/or when the calculation has failed.

At the end of a measurement time interval the processor PR113 therefore compares each auxiliary load counter value stored in table T3 with the copy of the corresponding load counter value stored in table T5 and in case these values are different it algebraically adds this difference to the respective real load counter value stored in table T1. Thus this real load counter value is adjusted.

In case at the end of a measurement time interval one or more E-bits of table T4 are still on 1 this means that no maintenance cells have been received for the corresponding virtual paths. These paths are considered to be isolated ones and for this reason the processor PR113 resets these E-bits to zero in both tables RT4 and T2.

When all the E-bits of table T4 are on 0 before the end of a measurement interval the processor PR113 may either already start the adjustment operation or perform other functions.

It should be noted that instead of being transmitted by the user stations the various cells could also be generated in other terminal circuits such as the interface circuits.

While the principles of the invention have been described above in connection with specific apparatus, it is to be clearly understood that this description is made only by way of example and not as a limitation on the scope of the invention.

I claim:

1. Communication switching system including a switching network (BSN) with at least one switching element (E113) having a plurality of input links (R4) and at least one output link (8), and processing means (PR113) for calculating the total bandwidth [B1(8)] used by virtual paths on said output link (8) from individual bandwidth values (LP) contained in path setup cells used for setting up said virtual paths, characterized in that said processing means (PR113) re-calculates said total bandwidth [SB(8)] at least from said individual bandwidth values contained in maintenance cells transmitted on said virtual paths and adjusts said calculated total bandwidth to correspond to said re-calculated total bandwidth.

2. Communication switching system according to claim 1, characterized in that the transmission of said maintenance cells is interleaved with that of said path setup cells and that said processing means (PR113) stores said calculated total bandwidth [B1(8)] in a first memory (T1) and at the start of a recalculation operation copy said calculated total bandwidth from said first memory (T1) into a second memory (T3) and resets the contents of a third memory (T5), the total bandwidth stored in said second memory (T3) and said individual bandwidth values (LP) being then used to re-calculate said total bandwidth in a cumulative way and the successive partial results thus obtained being stored in said third memory (T5).

3. Communication switching system according to claim 2, characterized in that said maintenance cells are transmitted on said virtual paths at a frequency such that with a predetermined probability and for each of said virtual paths on said output link (8) at least one maintenance cell is received by said processing means (PR113) during a measurement time interval, each maintenance cell containing said individual bandwidth value (LP) for the path on which it is transmitted, and that said processing means (PR113) re-calculate said total bandwidth [B1(8)] on said output link (8) during said measurement interval.

4. Communication switching system according to claim 3, characterized in that said measurement intervals follow one another in a continuous way.

5. Communication switching system according to claim 3, characterized in that it includes a fourth memory (T2) storing for each of said virtual paths a path bit (E1) whose set/reset condition is indicative of the busy/idle condition of this path and that said processing means (PR113) at the start of said measurement interval copies the path bits of said fourth memory (T2) into a fifth memory (T4), the set/reset condition of each of these bits then indicating that a maintenance cell received on the corresponding path is allowed to/prevented from being processed by said processing means and the path bit (E1) being reset after such processing.

6. Communication switching system according to claim 2, characterized in that the transmission of said maintenance cells is also interleaved with the transmission of path release cells containing an individual bandwidth value relating to the virtual path to be released and that said processing means (PR113) in addition to performing a path release operation processes each of said path release cells in the same way as each of said maintenance cells.

7. Communication switching system according to claim 3, characterized in that said processing means (PR113) perform said adjustment at the end of said measurement interval.

8. Communication switching system according to claim 5, characterized in that said processing means (PR113) perform said adjustment after all the path bits (E1) of said fifth memory (T4) have been reset.

9. Communication switching system according to claim 2, characterized in that said processing means (PR113) after having re-calculated said total bandwidth [SB1(8)] and, having stored it in said third memory, (T5) calculates the difference of said re-calculated bandwidth and the corresponding calculated total bandwidth stored in said second memory (T3) and algebraically add this difference to the corresponding total bandwidth stored in said first memory (T1), said total bandwidth being thus adjusted.

10. Communication switching system according to claim 5, characterized in that in said switching element (E113) each (R4) of said input links is coupled to a receive port (RX4) including second processing means (RPR4) and a sixth memory (RT4) and having access via switching means to any of a plurality of output links (⅛) including said at least one output link (8) as well as to an additional predetermined output link (9) which is continuously connected to a control circuit (SEC113) including said first mentioned processing means (PR113) and said first (T1), second (T3), third (T5), fourth (T2) and fifth (T4) memories.

11. Communication switching system according to claim 10, characterized in that subsequent to the receipt of a said path setup cell on an input link (T4) of said receive port (RX4) it is transmitted to said control circuit (SEC113) wherein said processing means (PR113) select a virtual path using said input link (R4) and one (8) of said output links (1/8), calculate said total bandwidth to be used on said selected output link (8) from said individual bandwidth value (LP) contained in said path setup cell and from a previously calculated total bandwidth already used on said output link, allow/inhibit the use of said selected virtual path for the transmission of a subsequent cell stream depending on the result of this calculation, and store in cooperation with said second processing means virtual path information (L1, L2, 8, E1) in said sixth memory (RT4), said path information containing said path bit (E1).

12. Communication switching system according to claim 11, characterized in that subsequent to the receipt of a said maintenance cell on an input link (R4) among said plurality of output links (1/8) of said receive port (RX4) said second processing means use the path information stored in said sixth memory (RT4) to form other path information, insert it into said maintenance cell and then transmit this cell to said control circuit (SEC113) wherein said processing means then use said other path information to find the corresponding calculated total bandwidth and the corresponding path bit (E1) in said second (T3) and fifth (T4) memories respectively and perform said re-calculation when said path bit is in the set condition indicating that the maintenance cell is the first one received on said path during said measurement interval.

13. Communication switching system according to claim 11, characterized in that it includes means to verify if a cell stream transmitted on a said virtual path subsequent to the transmission of a path setup cell therein does not exceed said individual bandwidth on the basis of which said virtual path was allowed to be used, said verifying means being able to adapt the bandwidth of said cell stream if required and the thus verified individual bandwidth value being inserted in said maintenance cell transmitted on said virtual path.

14. Communication switching system according to claim 12, characterized in that said maintenance cell having said other information inserted therein is also transmitted on an output of said plurality of outputs (1/8) of said switching element via a calculation circuit (CC) which calculates a protection code for at least part (IF) of the data stored in said maintenance cell.

15. Communication switching system according to claim 5, characterized in that said processing means (PR113) at the end of said measurement interval reset all said path bits (E1) in said fourth (T2) and sixth (RT4) memories.

16. Communication switching system according to claim 11, characterized in that said processing means (PR113) at the end of said measurement interval reset all said path bits (E1) in said fourth (T2) and sixth (RT4) memories.

17. A communication switching system, comprising:
a switching network (BSN) having at least one switching element (BSE) having a plurality of input links responsive to an incoming signal and having at least one output link for providing an outgoing signal, wherein said incoming signal comprises a path setup control cell (FIG. 4), data cells, maintenance cells (FIG. 5) and a path release control cell and wherein that path setup control cell includes individual bandwidth information relating to incoming signals to be sent and wherein said maintenance cells contain individual bandwidth information on said incoming signals actually sent; and processing means, responsive to individual bandwidth information contained in said path setup cells, for setting up a corresponding communication path by calculating total bandwidth to be utilized indicated by said path setup cells and, responsive to said individual bandwidth information contained in said maintenance cells to verify if said setup path is correct by recalculating said total bandwidth from these individual bandwidths and adjusting said total bandwidth in response to said recalculated total bandwidth for deciding whether to maintain said setup path.

* * * * *

UNITED STATES PATENT AND TRADEMARK OFFICE
CERTIFICATE OF CORRECTION

PATENT NO. : 5,199,027
DATED : March 30, 1993
INVENTOR(S) : P. Barri

It is certified that error appears in the above-identified patent and that said Letters Patent is hereby corrected as shown below:

At column 11, line 26, please change "[SB(8)]" to --[SB1(8)]--.

At column 13, line 2, after "bandwidth", please insert --[B1(8)]--.

Signed and Sealed this

Eleventh Day of October, 1994

Attest:

Attesting Officer

BRUCE LEHMAN

Commissioner of Patents and Trademarks